March 22, 1932. J. G. COLLINS 1,850,742

SPRING TESTING DEVICE

Filed Sept. 21, 1928

INVENTOR
James G. Collins
BY Chappell & Earl
ATTORNEYS

Patented Mar. 22, 1932

1,850,742

UNITED STATES PATENT OFFICE

JAMES G. COLLINS, OF KALAMAZOO, MICHIGAN, ASSIGNOR TO ATLAS PRESS COMPANY, OF KALAMAZOO, MICHIGAN

SPRING TESTING DEVICE

Application filed September 21, 1928. Serial No. 307,370.

The main object of this invention is to provide an improved testing device for coil springs which is compact, durable, very efficient and easily and rapidly manipulated.

Objects pertaining to details and economies of construction and operation will definitely appear from the description to follow.

A device embodying my invention is illustrated in the accompanying drawings, in which.

Figure 1:
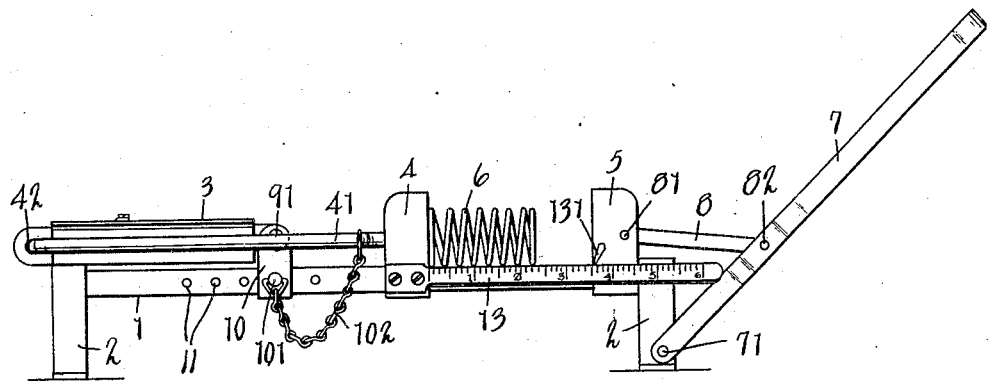
Fig. 1 is an elevation view of my improved spring tester device, a coil spring being inserted for testing.
Figure 3:
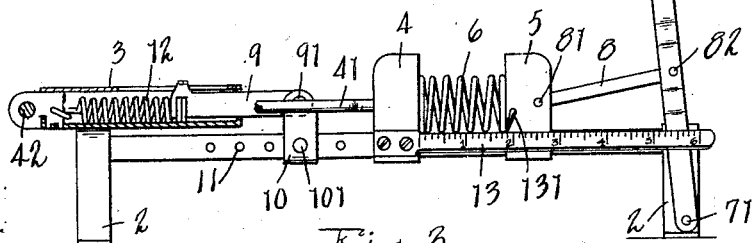
Fig. 3 is a partial sectional elevation view on irregular line 3—3 of Fig. 2 showing the spring to be tested compressed in process of testing and the relation of the various indicators.
Figure 2:
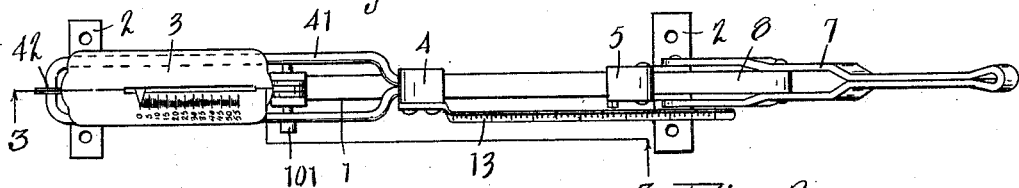
Fig. 2 is a top plan view, the spring to be tested being omitted.

The parts will be identified by their numerals of reference which are the same in all the views.

1 is the frame. 2 are the legs or supports therefor. 3 is a spring scale with face up secured to the frame by its main bar 9 pivoted at 91 to the adjustable bracket 10 described below. 4 is a spring abutment member slidably mounted on the frame 1. It is connected by rod yoke 41 to the scale spring member by pivot 42. Pressure on sliding abutment 4 will thus be measured or weighed and indicated by the scale.

5 is a plunger head slidably mounted on the frame 1. 6 is the spring to be tested. It is a coil spring of the valve spring type. It is interposed between the abutment member 4 and the plunger head 5. 7 is the operating lever fulcrumed at its lower end at 71 to the legs 2.

8 is a link connection pivoted at 81 to the plunger head 5 and fulcrumed at 82 to the hand lever 7. 10 is the adjustable bracket to which scale 3 is connected, mounted on frame 1 and retained adjustably by locking pin 101 adapted to lock the bracket 10 by the insertion in any of the series of holes 11 in the frame.

102 is a chain connecting the locking pin 101 to the rod 41 for safety against loss.

12 is the scale spring which is a master spring. 13 is a scale graduated in inches to read the length under compression of springs being tested. It is secured to the spring abutment slide 4 and disposed at the side of the spring to be tested.

131 is an index finger mounted on the plunger head 5 to cooperate with said scale and show the compression and comparative length of the spring being tested.

In a spring testing device, the compression strength of a spring is measured by compressing a coil spring to the desired dimensions and measuring the compression strength by a spring scale. The spring 12 used in the scale acts as a master spring. The test is accomplished by inserting the coil spring 6 on the frame 1 between the plunger 5 and the abutment member 4. Its free length is then measured. The hand lever 7 is then operated and the plunger which is slidably mounted on the frame compresses the spring. The spring 6 may thus be compressed to the desired dimension which is read on scale 13. The resistance or compression strength is then read on the scale 3.

Having thus described my invention, what I claim as new and desire to secure by Letters Patent, is:

1. In a spring tester, the combination of a suitable frame constituting a slide with supporting legs therefor, an adjustable bracket thereon, a spring balance with a pivotal connection from its main bar to the adjustable bracket, a sliding abutment on said frame with a suitable yoke connected to the spring member of said spring balance, a sliding plunger head on the said frame opposed to the said sliding abutment, a lever fulcrumed on said structure with a link connection to said plunger head for sliding the same, a scale graduated in inches carried by the said abutment and disposed parallel to the sliding frame and a pointer on the plunger cooperating with the graduations of the said scale to indicate the length of spring being tested, cooperating whereby the compression and length of spring are tested, as specified.

2. In a spring tester, the combination of a slide frame, a bracket thereon, a spring balance having a scale to indicate pressure in pounds, the main bar of which is connected to the said bracket, a sliding abutment with a yoke connected to the spring member of said balance, a reciprocating plunger on said slide frame to cooperate with said sliding abutment, and a measuring scale secured to said sliding abutment and associated with said plunger to show the relative depression thereof in inches and the length of the spring under compression, whereby both the extent of the force and the amount of compression are indicated.

In witness whereof I have hereunto set my hand.

JAMES G. COLLINS.